(No Model.) 4 Sheets—Sheet 4.
S. A. SADLER & R. H. WILSON.
APPARATUS FOR MAKING CHLORIN.
No. 573,039. Patented Dec. 15, 1896.
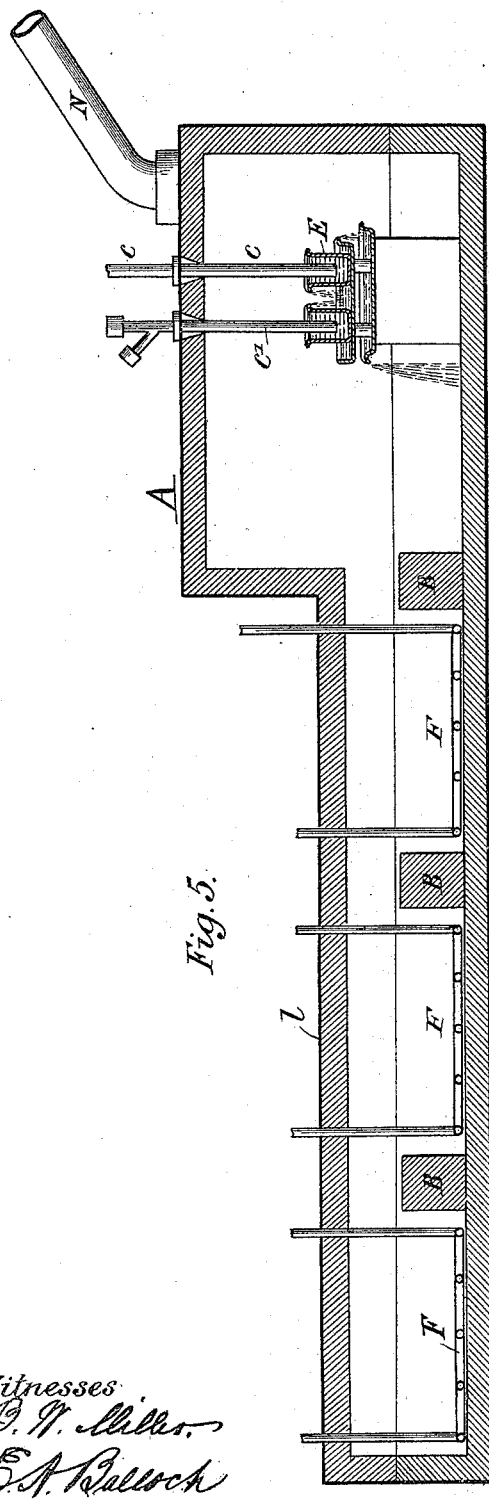
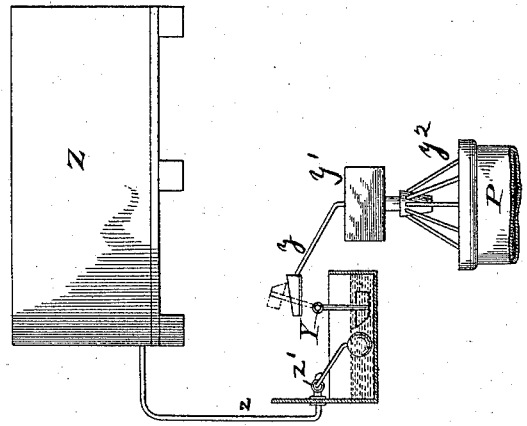
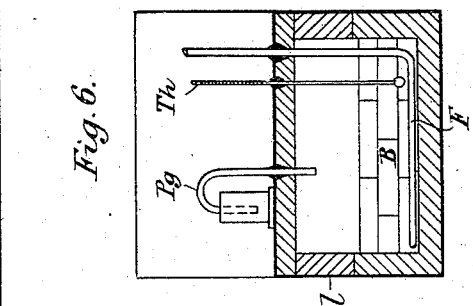
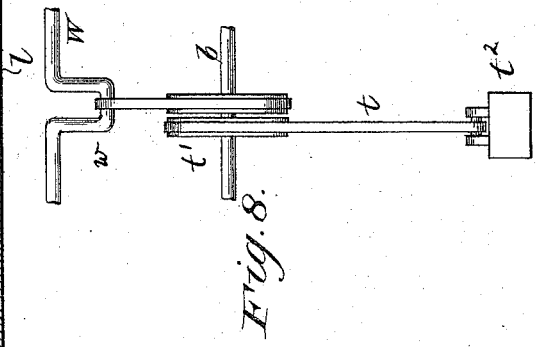
Witnesses
Inventors

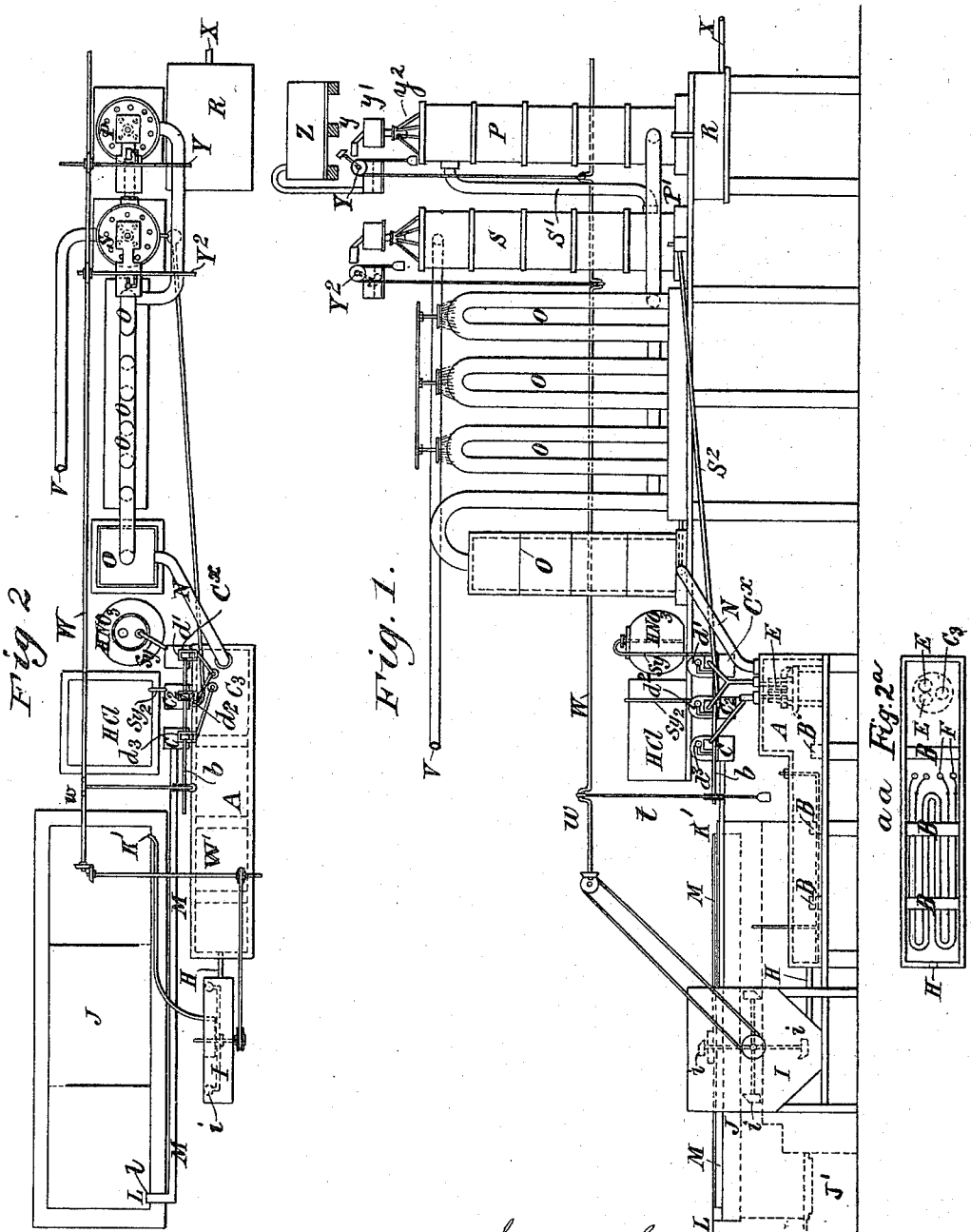

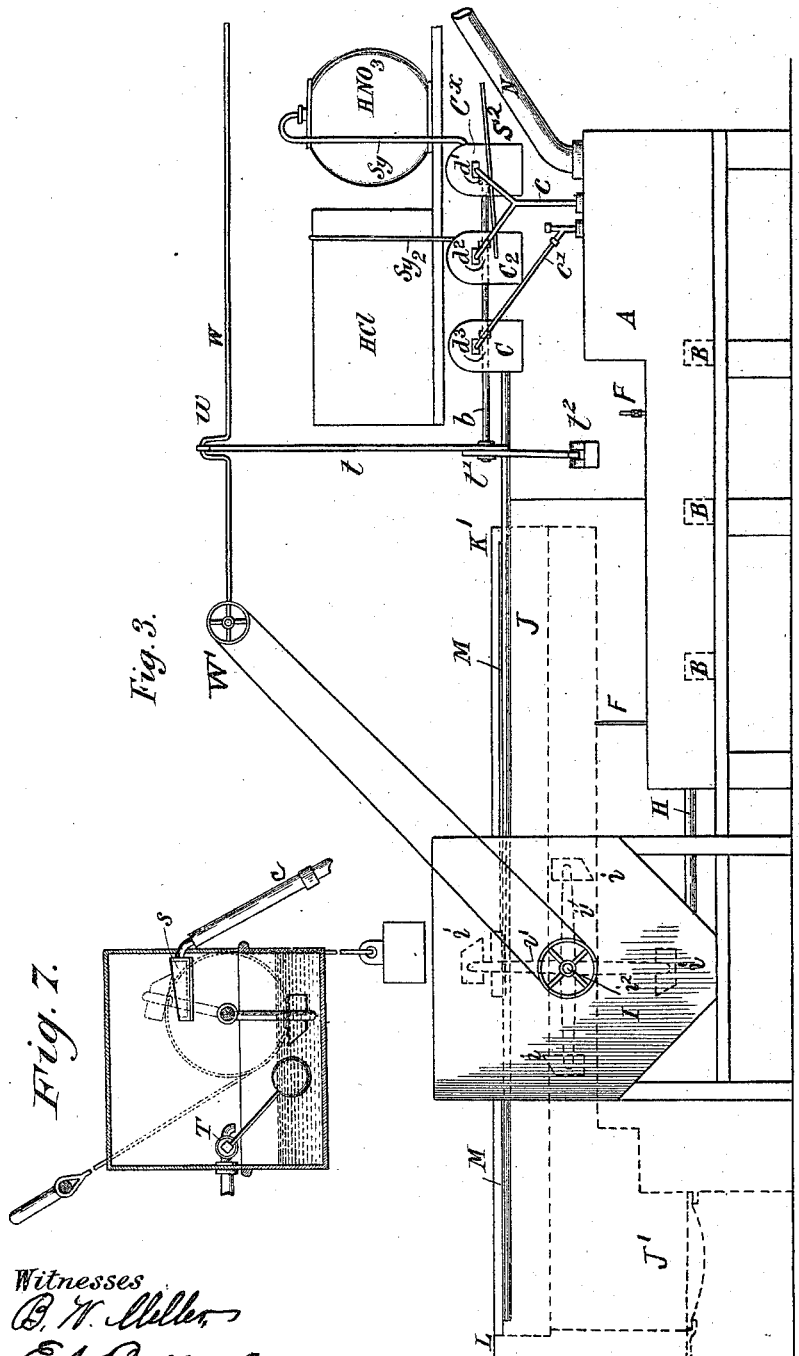

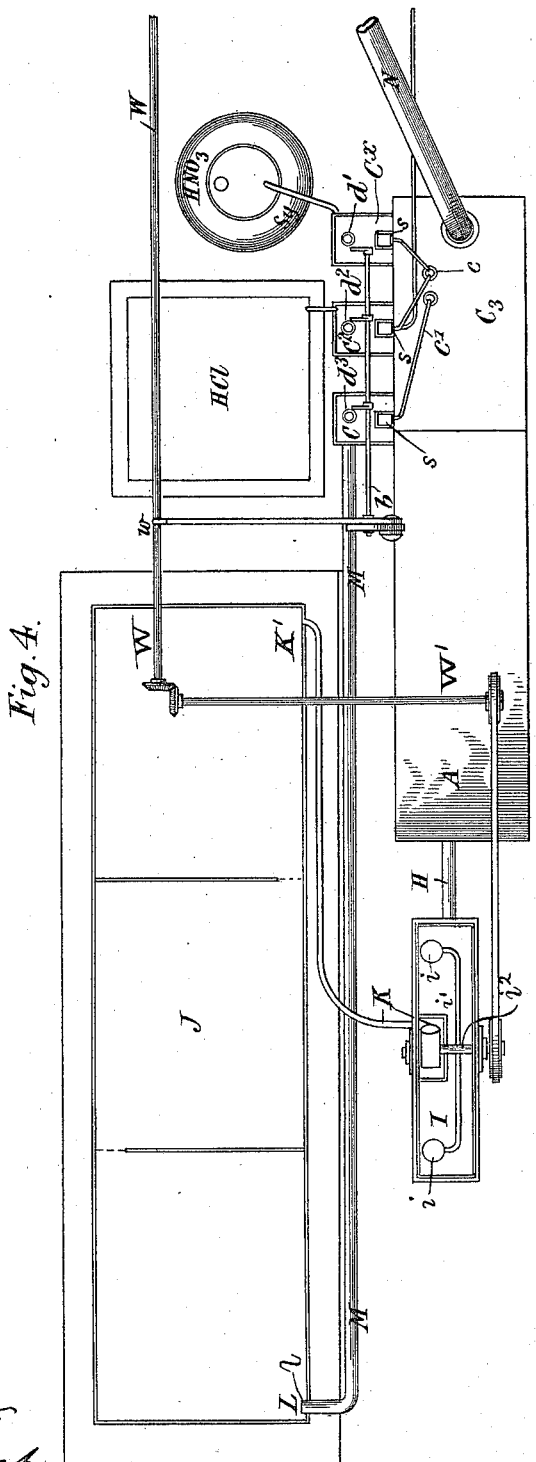

UNITED STATES PATENT OFFICE.

SAMUEL ALEXANDER SADLER AND ROBERT HUTTON WILSON, OF MIDDLESBOROUGH, ENGLAND, ASSIGNORS, BY MESNE ASSIGNMENTS, TO THE AMERICAN ALKALI COMPANY, LIMITED, OF LONDON, ENGLAND.

APPARATUS FOR MAKING CHLORIN.

SPECIFICATION forming part of Letters Patent No. 573,039, dated December 15, 1896.

Application filed July 1, 1895. Serial No. 554,657. (No model.)

*To all whom it may concern:*

Be it known that we, SAMUEL ALEXANDER SADLER and ROBERT HUTTON WILSON, manufacturing chemists, subjects of the Queen of Great Britain, residing at the Cleveland Chemical Works, Middlesborough, in the county of York, England, have invented certain new and useful Improvements in Apparatus for the Manufacture of Chlorin, of which the following is a specification.

This invention relates to means and apparatus for the continuous production of chlorin by the decomposition of hydrochloric acid by nitric acid in the presence of sulfuric acid.

The apparatus employed is shown in the accompanying drawings, in which—

Figure 1 is a side elevation of the apparatus; Fig. 2, a plan. Fig. $2^a$ is a plan view of part of the apparatus; Fig. 3, a side elevation, on an enlarged scale, of part of the apparatus; Fig. 4, a plan view of the same; Fig. 5, a longitudinal section through part of the apparatus shown in Figs. 3 and 4. Fig. 6 is a transverse section of the same; Fig. 7, a detail view, on an enlarged scale, of part of the apparatus shown in Figs. 3 and 4. Fig. 8 is a detail view of part of the operating mechanism. Fig. 9 is a detail view of part of the apparatus shown in Figs. 1 and 2, but not shown in the other figures. Figs. 3 to 9, inclusive, are all on a much larger scale than Figs. 1 and 2.

The hydrochloric acid employed is drawn from the supply vessel marked HCL, and the nitric acid is drawn from the supply vessel marked $HNO_3$. These vessels are filled from time to time, as required. Sulfuric acid is drawn from the evaporating-pan marked J, to which it is returned in a diluted state after use, this acid not being expended in the process.

In connection with each of the above-mentioned supply vessels there is a small receiver in which a mechanical bailer works. The receiver marked C is supplied with sulfuric acid from the evaporating-pan by means of the pipe M. That marked $C^2$ is supplied with hydrochloric acid from the vessel marked HCL, and a third receiver, $C^x$, receives nitric acid from the vessel marked $HNO_3$.

$b$ is a shaft which is caused to rotate to and fro by a cord $t$, passing around a pulley $t'$ upon the shaft $b$, connected at one end to a weight $t^2$ and at the other end to a crank $w$ on the shaft $w$, which may be driven in any convenient manner. The shaft $b$ has three arms, and these arms carry cups or bailers, (marked $d'$, $d^2$, and $d^3$.) The cups, which are of sizes to take suitably-measured quantities, descend and dip down into the liquids in the receivers, and when they have thus become filled they rise and each cup pours out a measured quantity into a funnel $s$, fixed above the level of the liquid in the receiver, which should be kept approximately uniform. The level may be kept constant in the receiver by a ball-valve T, as shown in Fig. 7. This valve and float are of course made of acid-resisting material.

The pipe M leads in the sulfuric acid from the evaporating-pan J (which has a suitable furnace J') into the receiver C, and siphons (marked $Sy$ and $Sy^2$) convey the other acids, respectively, from the vessels marked $HNO_3$ and HCL to the receivers $C^x$ and $C^2$. The quantities of acids measured out by the cups descend into the decomposer A, which is a long, preferably rectangular, closed vessel. It is built of well-burnt clay slabs, quarls, bricks, or stone flags, which dovetail or overlap each other, jointed with asbestos cement and incased with strong sheet-lead $l$, the lead being protected inside by a coating or thin layer of sulfate of lead or a suitable acid-resistant cement; or the decomposer may be constructed of stone flags, with the bottom a solid block scooped or hollowed out to a sufficient depth to contain the acids, so that they do not reach the joint forming the sides. This method of construction is shown in Figs. 5 and 6.

Cross-divisions B, of brick, stone, or other suitable material, are so arranged as to form weirs, over which the liquid has successively to pass. Inside the decomposer coils of lead pipe F F are placed, which are heated by steam or hot air sufficiently to energetically drive off the gas. Preferably each compartment of the decomposer has a separate coil, so that the degree of heating can be increased or diminished in any portion or part of said decomposer. Orifices are made in the top of the decomposer for thermometers and pressure-gages, whereby the process is regulated.

In Fig. 6 the thermometer is marked T$h$ and the pressure-gage P$g$. The latter is simply a bent glass tube dipping down into a glass vessel containing sulfuric acid.

The hydrochloric and nitric acids delivered by the cups into the funnels meet together in a pipe $c$, which enters the decomposer and dips into a glass vessel E, which the decomposer contains. Another pipe, $c'$, brings the measured quantities of sulfuric acid into the same or similar vessel. The glass vessel overflows and the mixed acids pass along the floor of the decomposer. With the exception of the sulfuric acid and some of the water the whole of the liquid, under the influence of the heat, passes off as gas as vapor by the pipe N. The weak sulfuric acid runs out at the end of the decomposer by a pipe H into a vessel I, in which is a lifter consisting of cups $i$ upon arms $i'$, carried by a shaft $i^2$, which is driven in the manner shown from the shaft W by well-known gearing W$'$. The cups pour the weak acid into a trough K K, which delivers it at K$'$ into the evaporating-pan at the end farthest removed from the fire, as shown in Fig. 4. When the acid reaches the point L, it has become concentrated, and is drawn out to be again used. It is delivered at $l$ to the pipe M, which carries it to the receiver C, as above explained. By the pipe N the evolved gases are conducted first through a dephlegmating column or scrubber O$'$, which returns any suspended or easily-condensible liquid. The gases then pass into earthenware or glass condensers O, cooled by being placed in water or by having water spread over their surfaces, as indicated, or by air-cooling, or partly by air and partly by water cooling. These condensing arrangements O are fixed at such an elevation that the condensed fluids, comprising nitrous, nitric, and chlorin compounds, water, &c., can go back to the decomposer preferably by the same channel N as that by which the gases came from it. The cooled gases are then passed through a pipe P$'$ to a suitable packed tower or towers P, so placed that the same machinery which is used to feed the decomposer can be employed to automatically supply sulfuric acid to the top of them in the exact quantities required to absorb nitrous-acid gas, which is mixed with the chlorin. The sulfuric acid is drawn from a cistern Z through a pipe $z$ and a float-valve $z'$, and a bailer at Y delivers it in measured quantities into the receptacle $y$, which in turn delivers it to another receptacle, $y'$, from which it passes by pipes $y^2$ to the tower P. This mechanical contrivance being geared, as shown in Fig. 1, to the shaft W, which is the same shaft that regulates the feed in the decomposer, it follows that if the rate of decomposition is accelerated or reduced the feed of the sulfuric acid to the top of the tower is regulated correspondingly.

A suitable covered tank R receives the nitrous vitriol which is drawn off at X. It is denitrated by steam and air in the usual well-known manner, the nitric acid recovered being used over again in the process and the sulfuric acid, after concentration, being returned to the cistern Z. The chlorin gas passes forward into another tower or towers S through the pipe S$'$, down which water is also automatically and only in required quantities fed by a bailer Y$^2$, driven from the same shaft M, as before mentioned, to wash out any hydrochloric acid which may be mixed with the chlorin. This hydrochloric acid is led by a pipe S$^2$ directly back into the receiver C$^2$. The chlorin gas is delivered at V, and may then be conducted to the usual lime-absorbing chambers and converted into bleaching-powder. The chlorin gas, being practically pure and unmixed with air or other diluent gases, produces bleaching-powder more readily and stronger than is the case with other processes, while for the production of the liquid chlorin it has very special advantages as well as also for the manufacture of chlorates, hypochlorites, chlorites, &c. In short, practically pure chlorin gas is obtained available either for the manufacture of bleaching-powder, liquid chlorin, chlorates, or any other chlorin compound.

We claim as our invention—

1. Apparatus for the manufacture of chlorin comprising the acid-supply vessels, a series of mechanical feeders operated in unison to supply the required relative proportions of the different liquids, means for operating said mechanical feeders, a decomposer to which the measured quantities of acid are delivered, and means for purifying the gases evolved in the decomposer.

2. Apparatus for the manufacture of chlorin comprising a decomposer in which the mixed acids are decomposed and chlorin and other gases are evolved, a scrubber or dephlegmating column, a pipe connecting this column with the decomposer, a series of pipes through which the gases pass connected with the scrubber, means for cooling these pipes, a tower into which the gases pass from the cooling-pipes, a pipe connecting the tower with the cooling-pipes, means for supplying sulfuric acid to said tower, another tower adjacent to said first-mentioned tower, a pipe connecting the two towers, means for supplying water to the second tower, and connections between the second tower and the decomposer for returning hydrochloric acid to the decomposer.

3. Apparatus for the manufacture of chlorin, comprising a decomposer in which the mixed acids are decomposed and chlorin and other gases and vapors are evolved, a vat for containing sulfuric acid, a tank adjacent to the vat, pipe connections between the decomposer and the tank, a mechanical lifter for transferring sulfuric acid from the tank to the vat, vessels containing hydrochloric acid and nitric acid, receivers having pipe connections with the vat and with the acid-containing vessels, pipes leading from the decomposer, bailers for transferring acid in regulated quantities from the receivers to the decomposer, and means for scrubbing, cooling, washing and purifying the gases evolved in the decomposer.

4. Apparatus for the manufacture of chlorin, comprising a decomposer, vessels containing hydrochloric acid, nitric acid and sulfuric acid, receivers having pipe connections with said acid-containing vessels, funnels in the receivers having pipe connections with the decomposer, the rotary bailing-cups for transferring acid in regulated quantities into the funnels and thus feeding it to the decomposer, and means for scrubbing, concentrating and purifying the gases evolved in the decomposer.

5. Apparatus for the manufacture of chlorin, comprising a decomposer in which the mixed acids are decomposed and chlorin and other gases and vapors are evolved, vessels containing hydrochloric acid and sulfuric acid, receivers having pipe connections with the acid vessels, funnels having pipe connections with the decomposer, mechanical bailers for transferring acid in regulated quantities to the funnels, towers into which the gases flow from the decomposer, a mechanical bailer for supplying sulfuric acid in measured quantities to one of the towers, a mechanical bailer for supplying water in regulated quantities to the other tower, and means for simultaneously operating all of said bailers, substantially as described.

6. Apparatus for the manufacture of chlorin, comprising a decomposer provided with a series of weirs at the bottom dividing it into a series of compartments but arranged below the level of the decomposer so that acids are caused to pass over the weirs and any intermixing of the liquid at the lower level with that of the higher level is prevented, heating-coils arranged in the compartments of the decomposer, overflow vessels E arranged at one end of the decomposer, pipes passing down into said overflow vessels, and means for supplying acid to said pipes.

SAMUEL ALEXANDER SADLER.
ROBERT HUTTON WILSON.

Witnesses:
J. W. LONGSTAFF,
T. HANSON.